US011071087B2

(12) United States Patent
Frenger et al.

(10) Patent No.: US 11,071,087 B2
(45) Date of Patent: Jul. 20, 2021

(54) NETWORK NODE, WIRELESS DEVICE AND METHODS PERFORMED THEREIN (71) Applicant: Telefonaktiebolaget LM Ericsson (publ), Stockholm (SE)

(72) Inventors: Pål Frenger, Linköping (SE); Johan Rune, Lidingö (SE); Stefan Wager, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 491 days.

(21) Appl. No.: 15/532,862

(22) PCT Filed: Apr. 13, 2017

(86) PCT No.: PCT/SE2017/050376
§ 371 (c)(1),
(2) Date: Jun. 2, 2017

(87) PCT Pub. No.: WO2018/190759
PCT Pub. Date: Oct. 18, 2018

(65) Prior Publication Data
US 2019/0007925 A1  Jan. 3, 2019

(51) Int. Cl.
H04W 68/02    (2009.01)
H04W 24/08    (2009.01)
H04L 5/00     (2006.01)
H04W 76/11    (2018.01)
H04W 4/029    (2018.01)
(Continued)

(52) U.S. Cl.
CPC .......... H04W 68/02 (2013.01); H04B 7/0413 (2013.01); H04B 7/0417 (2013.01); H04L 5/0048 (2013.01); H04L 5/22 (2013.01);
H04W 4/029 (2018.02); H04W 24/08 (2013.01); H04W 68/005 (2013.01); H04W 68/12 (2013.01);
(Continued)

(58) Field of Classification Search
CPC ..... H04W 68/02; H04W 68/00; H04W 88/06; H04W 24/08; H04W 68/005; H04W 68/12; H04W 76/11; H04W 4/029; H04W 68/04; H04W 56/001; H04B 7/0417; H04B 7/0413; H04L 5/22; H04L 5/0048
USPC ................ 455/458, 426.1, 517, 552.1, 553.1
See application file for complete search history.

(56) References Cited
U.S. PATENT DOCUMENTS

2005/0048982 A1   3/2005 Roland et al.
2005/0148349 A1   7/2005 Putcha et al.
(Continued)

FOREIGN PATENT DOCUMENTS

WO   2008097593 A2   8/2008
WO   2009023497 A2   2/2009
WO   2014048478 A1   4/2014

Primary Examiner — Fred A Casca
(74) Attorney, Agent, or Firm — Sage Patent Group (57) ABSTRACT Embodiments herein relate to a method performed by a network node (13) for handling communication of a wireless device (10) in a wireless communication network (1). The network node (13), such as an MME, pages the wireless device (10) using a first paging channel; and pages the wireless device (10) using a second paging channel, wherein paging the wireless device (10) using the first paging channel comprises selecting one or more radio network nodes to page the wireless device (10) using the first paging channel based on information relating to current knowledge of a location of the wireless device (10).

21 Claims, 8 Drawing Sheets (51) Int. Cl.

| | |
|---|---|
| *H04B 7/0417* | (2017.01) |
| *H04L 5/22* | (2006.01) |
| *H04B 7/0413* | (2017.01) |
| *H04W 68/00* | (2009.01) |
| *H04W 68/12* | (2009.01) |
| *H04W 56/00* | (2009.01) |
| *H04W 68/04* | (2009.01) |

(52) U.S. Cl.
 CPC .......... *H04W 76/11* (2018.02); *H04W 56/001* (2013.01); *H04W 68/04* (2013.01)

(56) References Cited

U.S. PATENT DOCUMENTS

| | | | |
|---|---|---|---|
| 2005/0233732 A1* | 10/2005 | Kwak | H04H 60/91 |
| | | | 455/414.1 |
| 2009/0176515 A1* | 7/2009 | Willey | H04W 68/025 |
| | | | 455/458 |
| 2009/0239555 A1* | 9/2009 | Sim | H04W 4/08 |
| | | | 455/458 |
| 2013/0203449 A1 | 8/2013 | Tiedemann, Jr. et al. | |
| 2014/0192659 A1* | 7/2014 | Tian | H04W 72/0453 |
| | | | 370/252 |
| 2015/0038180 A1* | 2/2015 | Quick, Jr. | H04W 64/00 |
| | | | 455/458 |
| 2017/0230951 A1* | 8/2017 | Xiong | H04W 4/70 |

* cited by examiner

NETWORK NODE, WIRELESS DEVICE AND METHODS PERFORMED THEREIN

TECHNICAL FIELD

Embodiments herein relate to a network node, a wireless device and methods performed therein relating to wireless communication. Furthermore, a computer program and a computer readable storage medium are also provided herein. In particular, embodiments herein relate to communication of the wireless device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area and provide radio coverage over service areas or cells, which may also be referred to as a beam or a beam group, with each service area or beam being served or controlled by a radio network node such as a radio access node e.g., a Wi-Fi access point or a radio base station (RBS), which in some networks may also be denoted, for example, a "NodeB" or "eNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Figure 1:
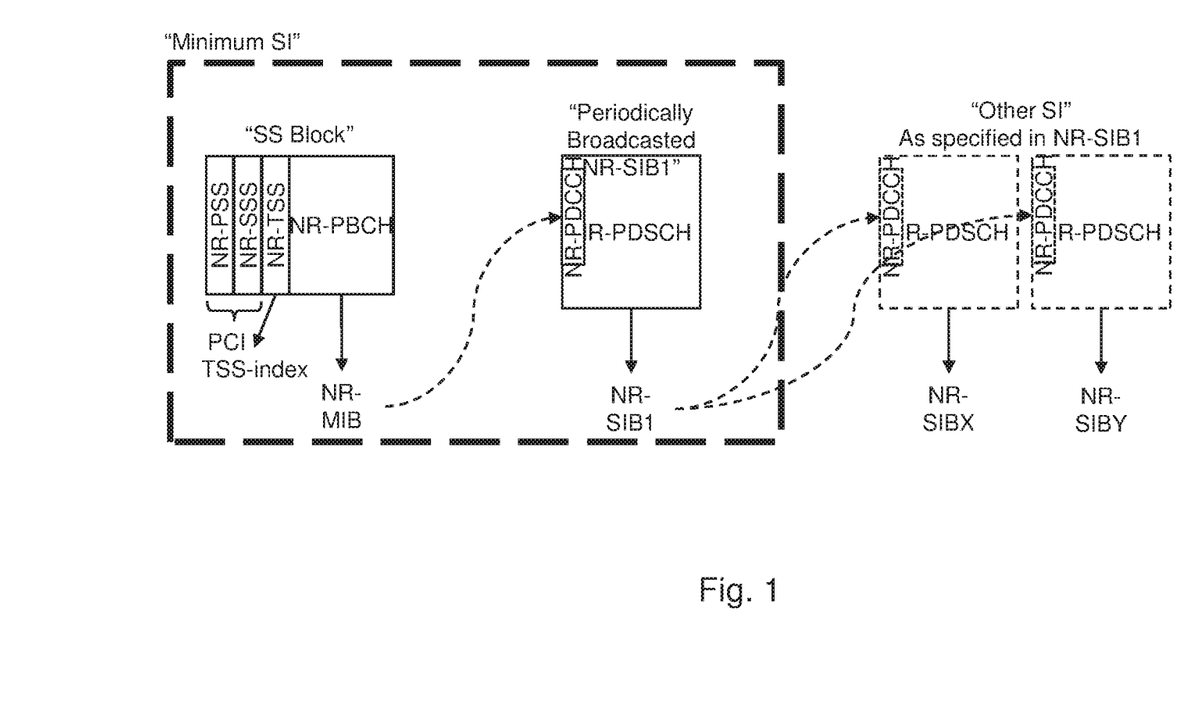
FIG. 1 is a schematic logical overview of a potential solution for NR system information distribution.

The set of channels and signals depicted in FIG. 1 are currently being discussed in TSG-RAN Working Group 1 (RAN1) and TSG-RAN Working Group 2 (RAN2) for 5G New Radio (NR) in 3GPP. In FIG. 1 the NR-Primary Synchronization Signal (PSS)/Secondary Synchronization Signal (SSS) defines the Physical Cell Identity (PCI). Alternatively, the PCI is defined by only the SSS. In RAN1, there have been proposals to also introduce another signal component, here denoted ESS, that would convey a time offset of a Synchronization Signal (SS) Block within an SS Burst. It is for further studying to define if the ESS is a separate signal or if this information is provided to the wireless device in some other way.

A Master Information Block (MIB) is transmitted together with the NR-PSS/NR-SSS inside the NR Physical Broadcast Channel 1 (NR-PBCH).

The PCI defines the NR service area or cell. In case a radio network node transmits the synchronization signals in different beams during different time slots then the MIB content may be different in different beams. However, in case the MIB is different the wireless device cannot perform simple energy combining of multiple NR-PBCH receptions.

The MIB contains information on how the wireless device can receive System Information Block 1 (SIB1) which is transmitted in the second physical broadcast channel, here denoted NR-SPBCH. The SIB1 contains information related to where to receive all the remaining minimum system information such as SIB2. In case some minimum System Information (SI) must be requested and then sent on demand, then SIB1 will contain the necessary configurations the wireless device needs.

By transmitting SIB1 in a physical broadcast channel (NR-SPBCH) that is configured in the MIB multiple service areas and beams are enabled to cooperate in transmitting the essential SIBs, e.g. using a single frequency network (SFN) modulation.

The following structure is assumed for the distribution of the minimum SI in NR:
  The PCI and the MIB is transmitted in an SS Block (NR-PSS+NR-SSS+NR-PBCH) with a period of at most 80 ms, i.e. the SS Burst set duration is assumed to be 80 ms.
  At least SIB1 is transmitted in a second physical broadcast channel (NR-SPBCH) that is configured in the MIB. SIB1 contains information about how the other SIBs are transmitted. The NR-SPBCH is transmitted with a period of at most 80 ms. The value of Transmission Time Interval (TTI) of the NR-SPBCH is for further studying but it could be larger than 80 ms, e.g. 640 ms in case there are 8 different redundancy versions/repetitions of the NR-SPBCH content.

For enabling long network Discontinuous Transmission (DTX) it is beneficial to define the NR-PSS/SSS periodicity to be as large as possible. In case the NR-PSS/SSS periodicity is e.g. 80 ms, it makes sense to transmit the MIB after every NR-PSS/SSS transmission. It is for further studying whether there should be a MIB transmission after every NR-PSS/SSS transmission in case the NR-PSS/SSS is transmitted more often.

According to current paging methods a wireless device is paged using a PCI based paging channel leading to an inefficient paging method.

SUMMARY

An object herein is to provide a mechanism that pages a wireless device in a wireless communication network in an efficient manner.

According to an aspect the object is achieved by providing a method performed by a network node for handling communication of a wireless device in a wireless communication network. The network node pages the wireless device using a first paging channel; and pages the wireless device using a second paging channel. The paging of the wireless device using the first paging channel comprises selecting one or more radio network nodes to page the wireless device using the first paging channel based on information relating to current knowledge of a location of the wireless device.

According to another aspect the object is achieved by providing a method performed by a wireless device for handling communication in a wireless communication network. The wireless device monitors a first paging channel and a second paging channel for a paging message. Upon detection of the paging message, the wireless device responds back to a radio network node sending the paging message, wherein the first paging channel is PCI based and the second paging channel is explicitly configured by an identifier provided in a system information of the wireless communication network.

According to yet another aspect the object is achieved by providing a wireless device for handling communication in a wireless communication network. The wireless device being configured to monitor a first paging channel and a second paging channel for a paging message. Upon detection of the paging message, the wireless device is configured to respond back to a radio network node sending the paging message, wherein the first paging channel is PCI based and the second paging channel is explicitly configured by an identifier provided in a system information of the wireless communication network.

According to still another aspect the object is achieved by providing a network node for handling communication of a wireless device in a wireless communication network. The network node is configured to page wireless device using a first paging channel and to page the wireless device using a second paging channel. The network node is further configured to select one or more radio network nodes to page the wireless device using the first paging channel based on information relating to current knowledge of a location of the wireless device.

It is furthermore provided herein a computer program comprising instructions, which, when executed on at least one processor, cause the at least one processor to carry out any of the methods above, as performed by the wireless device or the network node. It is additionally provided herein a computer-readable storage medium, having stored thereon a computer program comprising instructions which, when executed on at least one processor, cause the at least one processor to carry out the method according to any of the methods above, as performed by the wireless device or the network node.

The wireless device listens for paging messages on two different paging channels, e.g. one PCI-based paging channel and one explicitly configured paging channel. The network node can page the wireless device first locally (in a small number of service areas using the PCI-based paging channel) and then in a larger area (possibly with SFN-modulation) using the explicitly configured paging channel.

Hence, a paging method is herein disclosed where the radio resources are used in an efficient manner.

BRIEF DESCRIPTION OF THE DRAWINGS

Embodiments will now be described in more detail in relation to the enclosed drawings, in which.

DETAILED DESCRIPTION

Figure 2:
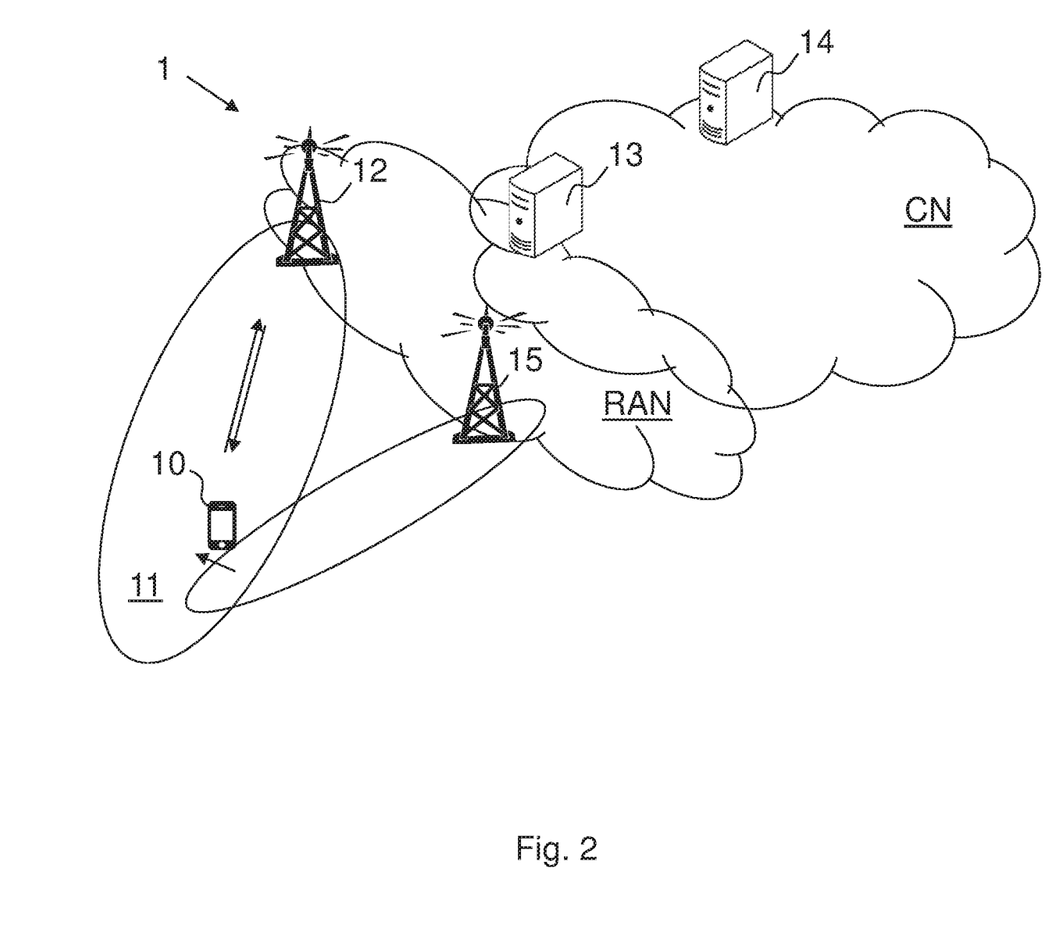
FIG. 2 is a schematic diagram depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

In the wireless communication network 1, a wireless device 10, such as a mobile station, a non-access point (non-AP) STA, a STA, a user equipment and/or a wireless terminals, may communicate via one or more Access Networks (AN). e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a service area.

The wireless communication network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 communicates with the wireless device 10 with Downlink (DL) transmissions to the wireless device 10 and Uplink (UL) transmissions from the wireless device 10.

The wireless communication network 1 may comprise a network node 13 such as a Mobility Management Entity (MME), a Serving GPRS Support Node (SGSN), a server keeping track of wireless devices, or similar. The network node 13 controls or manage wireless devices in service areas in the wireless communication network 1.

The wireless communication network 1 may further comprise another network node 14 such as a gateway, a location controlling node, a Gateway Mobile Location Centre (GMLC) configured to retrieve location or position of wireless devices in wireless communication network 1 upon request.

The wireless communication network 1 may further comprises an additional radio network node such as a second radio network node 15 providing radio coverage over a geographical area referred to as second service area or cell of a second radio access technology (RAT), such as NR, 5G, LTE, Wi-Fi or similar. The first and second RAT may be the same RAT. However, it should be noted that a radio network node, such as the radio network node 12, may also serve multiple cells, thus, serving the second service area as well. To simplify the description herein, it is assumed herein that a radio network node, such as the radio network node 12, serves only one cell but as stated herein the different cells or service areas may be served by a same radio network node.

According to embodiments herein the wireless device 10 monitors two paging channels for a paging message, thus, the wireless device 10 monitors a first paging channel and a second paging channel. The first paging channel is PCI based and the second paging channel is explicitly configured by an identifier provided in a system information of the wireless communication network 1. Said explicitly provided identifier or configuration identifier is used to derive physical channel properties such as scrambling key and demodulation reference signal in a similar way as the PCI is normally used. The PCI is used as a configuration identifier for cell specific physical channels, i.e. the wireless device 10 uses the PCI to determine the scrambling key and demodulation reference signal used to decode the physical channels associated with a particular cell. When a location of the wireless device 10 within a tracking area, or set of tracking areas, is known, or location is likely with a high probability, a small paging area is used and the wireless device 10 is paged in a small number of service areas, e.g. the service area 11, using a cell-based or PCI-based paging channel, i.e. the first paging channel. The wireless device may be configured with first physical channel configuration parameters for the first paging channel. The first physical channel configuration may comprise NR-PSS/SSS/Third Synchronization Signal (TSS) that provides timing, and PCI that provides implicit mapping used to determine demodulation reference signal (DMRS). This first paging channel is suitable for "cell level paging" i.e. multi-cell-cast of the paging message.

When the location of the wireless device 10 within the tracking area, or the set of tracking areas, is not known (with high enough probability) the wireless device 10 may be paged in the whole tracking area, or set of tracking areas, covering multiple service areas (i.e. using a large paging area) and the wireless device 10 is paged using an explicitly configured paging channel that can be transmitted in a broadcast format, i.e. the second paging channel. Said wireless device 10 may receive, in SI of the radio network node 12, second physical channel configuration parameters related to the second paging channel. The SI may be broadcasted or be retrieved on-demand. The second physical channel configuration parameters may comprise DMRS and timing reference signals that are explicitly configured for the wireless device 10. The second paging channel is suitable for "tracking-area-wide paging" using a broadcast transmission format e.g. a single-frequency-network (SFN) transmission.

By instructing the wireless device 10 to monitor two paging channels, the first paging channel that is PCI-based and the second paging channel that is explicitly configured, efficient transmission of paging messages is achieved over a large area as well as high paging capacity in the case where the location of the wireless device 10 is known, or possibly known.

Note that the wireless device 10 does not have to monitor both paging channels during a whole paging window. For example, if the network node has N≥2 chances to page the wireless device 10 in a paging window the wireless device 10 may monitor the first paging channel in the N/2 first paging occasions and then switch to monitor the second paging channel in the N/2 last paging occasions. Thus as the network node 13 pages the wireless device 10 in a small area, the wireless device 10 only monitors the paging channel that has a coverage area close to the wireless device 10. When the network node 13 then page the wireless device 10 in a larger area, the wireless device 10 consequently switches to monitor a paging channel with a larger coverage area. Thus the proposed solution provides a better matching of paging channel transmission and reception areas.

A paging message could be transmitted using a control and data physical channel structure, e.g. a physical downlink control channel (PDCCH)/physical downlink shared channel (PDSCH). In that case a paging indicator may be transmitted on the PDCCH or similar. The wireless device 10 may use a common search space for detecting the paging indicator on the PDCCH. The actual paging message may be transmitted on the PDSCH or similar, configured by the paging indicator in the PDCCH. Alternatively the actual paging message may be directly encoded on the PDCCH, without using any sub-sequent PDSCH transmission. In these examples the paging message is communicated using generic physical channels not exclusively defined for paging messages.

Another alternative is to directly define one or more physical channels used only for page or paging messages. Hence that the wireless device is "configured to receive a paging channel" shall be interpreted as including any kind of channel (control or data channel, dedicated or common, specific for paging or generic) that may convey a paging message to the wireless device 10.

Figure 3:
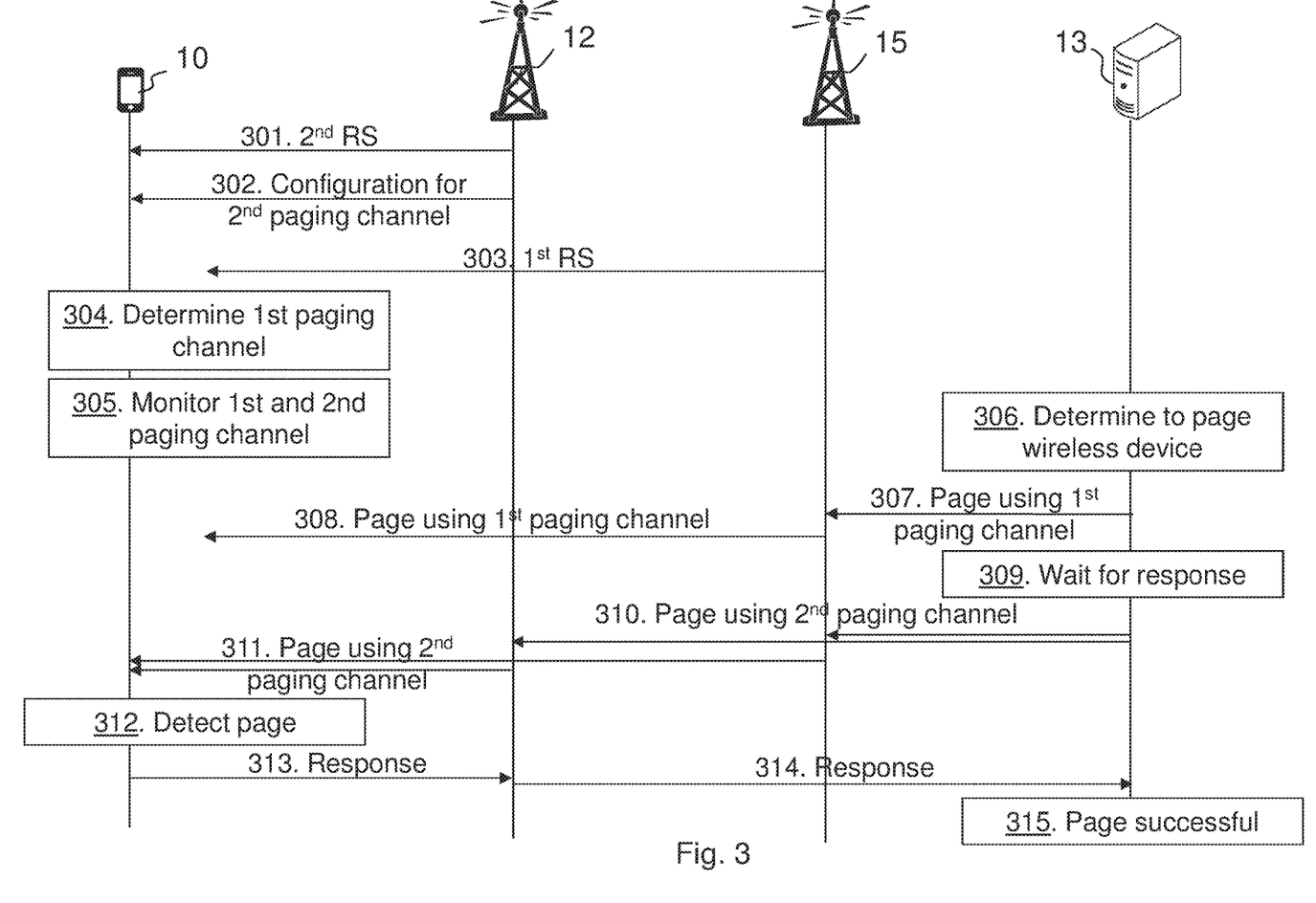
FIG. 3 is a combined flowchart and signalling scheme according to embodiments herein.

FIG. 3 is a combined flowchart and signaling scheme illustrating some embodiments herein.

Action 301.

The radio network node 12 transmits reference signals (RS) such as second cell reference signals. Note that the PSS/SSS may constitute the reference signals.

Action 302.

The second radio network node 15 also transmits RSs such as first cell reference signals. All service areas in the wireless communication network transmit cell reference signals and some RSs may reach the wireless device 10 and some may not. Note that the PSS/SSS may constitute the reference signals.

Action 303.

The wireless device 10 may be configured with at least the second paging channel from e.g. the radio network node 12, which second paging channel is explicitly configured by the identifier provided in the system information of the wireless communication network 1.

Action 304.

The wireless device 10 may determine a first paging channel configuration based on the received reference signals from e.g. the second radio network node 15. For example, from transmitted PSS/SSS, or only from transmitted SSS, the PCI is derived and from the PCI the first paging channel configuration is determined.

Action 305.

The wireless device 10 then, at some point in time, starts to monitor the first paging channel and the second paging channel for a paging message.

Action 306.

The network node 13 such as an MME may determine to page the wireless device 10. The network node 13 may have stored the latest known location of the wireless device 10. For example, each radio network node, such as the radio network node 12 and the second radio network node 15, to which the wireless device 10 connects may inform the network node 13 of the cell the wireless device 10 is located in when this happens. The network node 13 may then store this cell information, which then constitutes the latest known location of the wireless device 10. As an alternative, the network node 13 may be aided by another type of network node to acquire the location or the latest known location of the wireless device 10. For example, a GMLC or similar node may be responsible for keeping track of the location, or the latest known location of the wireless device 10 and may provide this location or latest known location to another node, e.g. the network node 13, upon request. Another option is that the GMLC or similar node, upon request from another node, such as the network node 13, acquires and provides the location or latest known location of the wireless device 10. With the alternative where the network node 13 is aided by another type of network node to acquire the location or the latest known location of the wireless device 10, it requests the location or latest known location of the wireless device 10 from the other network node. Based on the acquired information about the latest known location of the wireless device 10, the network node 13 selects one or more radio network nodes e.g. the second radio network node 15 (assuming that a cell served by the second radio network node 15 is the latest known location of the wireless device 10) to execute the transmission of the paging message to the wireless device 10 using the first paging channel. The network node 13 may select the one or more radio network nodes based on prior knowledge of location of the wireless device 10.

Action 307.

The network node 13 transmits a paging message to the second radio network node 15 indicating to use the first paging channel.

Action 308.

The second radio network node 15 transmits the paging message using the first paging channel, i.e. the PCI-based paging channel, and thus the paging is carried out over a limited area where the wireless device 10 is likely to be located.

Action 309.

The network node 13 waits for a response of the paging.

Action 310.

After not receiving any response, the network node 13 decides to page the wireless device 10 in a larger area using the second paging channel. The network node 13 transmits the paging message to a plurality of radio network nodes such as the radio network node 12 and the second radio network node 15. The plurality of radio network nodes are more radio network nodes than the selected one or more radio network nodes in action 306. The paging message is thus forwarded to a larger set of radio network nodes. Note that the plurality of radio network nodes may exclude the radio network node(s) in which paging message(s) has(have) already been transmitted in action 308, e.g. the second radio network node. In a special case, the plurality of radio network nodes may then consist of only one radio network node, e.g. the second radio network node 15, i.e. in this special case the plurality of radio network nodes is not a larger set of radio network nodes.

Action 311.

The paging message is transmitted by the radio network node 12 and the second radio network node 15. The paging message is transmitted using the second paging channel, possibly transmitted using a single frequency network (SFN) modulation format.

Action 312.

The wireless device 10 receives the paging message over the second paging channel e.g. from the radio network node 12.

Action 313.

The wireless device 10 may then send a paging response to the radio network node 12.

Action 314.

The radio network node 12 then forwards the paging response to the network node 13, i.e. a paging manager node, in the wireless communication network 1.

Action 315.

When the network node 13 receives the paging response a successful paging of the wireless device 10 has been performed.

Hence, embodiments herein enable the network node 13, e.g. when the location of the wireless device within the tracking area, or the set of tracking areas, is (approximately) known (with high probability), to use a small paging area and to page the wireless device in a small number of service areas (e.g. the service area 11) using the PCI based first paging channel. Furthermore, the network node 13 is enabled, e.g. when the location of the wireless device 10 within the tracking area, or the set of tracking areas, is not known (with high enough probability), to page the wireless device 10 in the whole tracking area, or the set of tracking areas, covering multiple service areas (i.e. using a large paging area) and the wireless device 10 is paged using the explicitly configured second paging channel, which paging message may be transmitted in a broadcast format.

Figure 4:
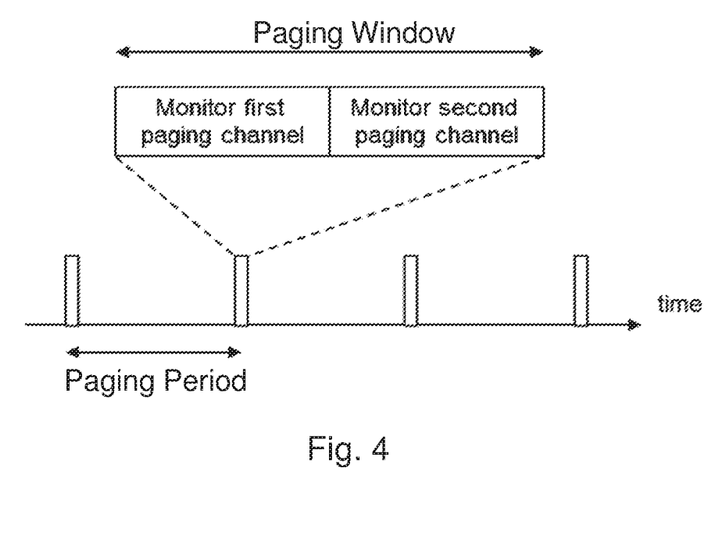
FIG. 4 is a schematic overview depicting a paging period according to some embodiments herein.

Note that the wireless device 10 monitoring of the first and second paging channels may coincide, see FIG. 4. The wireless device 10 may monitor the paging channels consecutively in a paging window, e.g. first the first paging channel and then directly followed by monitoring for the second paging channel in the paging window.

The wireless device 10 may monitor the first and second paging channels once every paging period.

Figure 5:
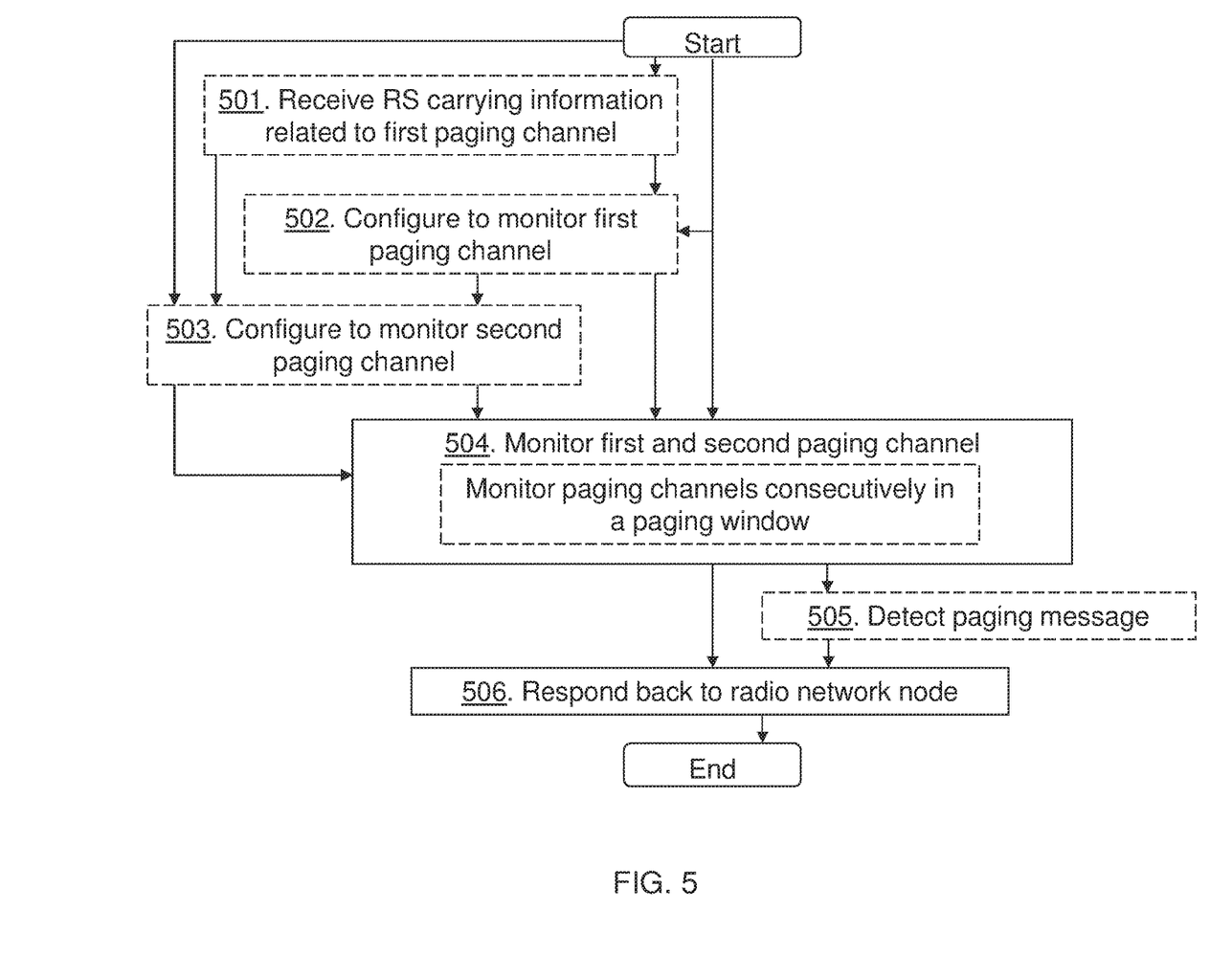
FIG. 5 is a flowchart depicting a method performed by a wireless device according to embodiments herein.

FIG. 5 is a flowchart depicting a method performed by the wireless device 10 for handling communication in the wireless communication network. The actions do not have to be taken in the order stated below, but may be taken in any suitable order.

Actions performed in some embodiments are marked with dashed boxes.

Action 501.

The wireless device 10 may receive one or more reference signals such as cell reference signals carrying information such as NR-PSS/SSS/TSS that provides timing and PCI that provides implicit mapping used to determine the DMRS of the service area 11.

Action 502.

Furthermore, the wireless device 10 may further be configured based on the information carried in the references signals to monitor the first paging channel.

Action 503.

The wireless device 10 may be configured e.g. from the radio network node 12 or pre-configured, to monitor the second paging channel. Configurations of one or more physical control channel(s) may be explicitly provided in the broadcasted system information. Said one or more physical control channel(s) may be used by the wireless device 10 for idle mode functions such as reception of paging messages and/or reception of on demand system information. Note that this is different from e.g. LTE where the wireless device first finds the physical control channel (implicitly by detecting the PCI) and then uses this control channel to read the broadcasted system information. Said configuration may provide the wireless device 10 with information on DMRS sequence and resource element set; time synchronization reference signal; physical resources in time/frequency/code domains to monitor; and control channel search space definition.

Action 504.

The wireless device 10 monitors the first paging channel and the second paging channel. The first paging channel is PCI based and the second paging channel is explicitly configured by the identifier provided in the system information of the wireless communication network 1. The identifier may be provided in the MIB or the SIB of the system information. The wireless device 10 may monitor the paging channels consecutively in a paging window, e.g. first the first paging channel and the directly followed by monitoring for the second paging channel in the paging window.

Action 505.

The wireless device 10 may detect the paging message in the first or the second paging channel.

Action 506.

Upon detection of the paging message, the wireless device 10 responds back to the radio network node sending the paging message. Thus, the wireless device 10 may respond to the paging message with a response such as a paging response to the radio network node transmitting the paging message.

Figure 6:
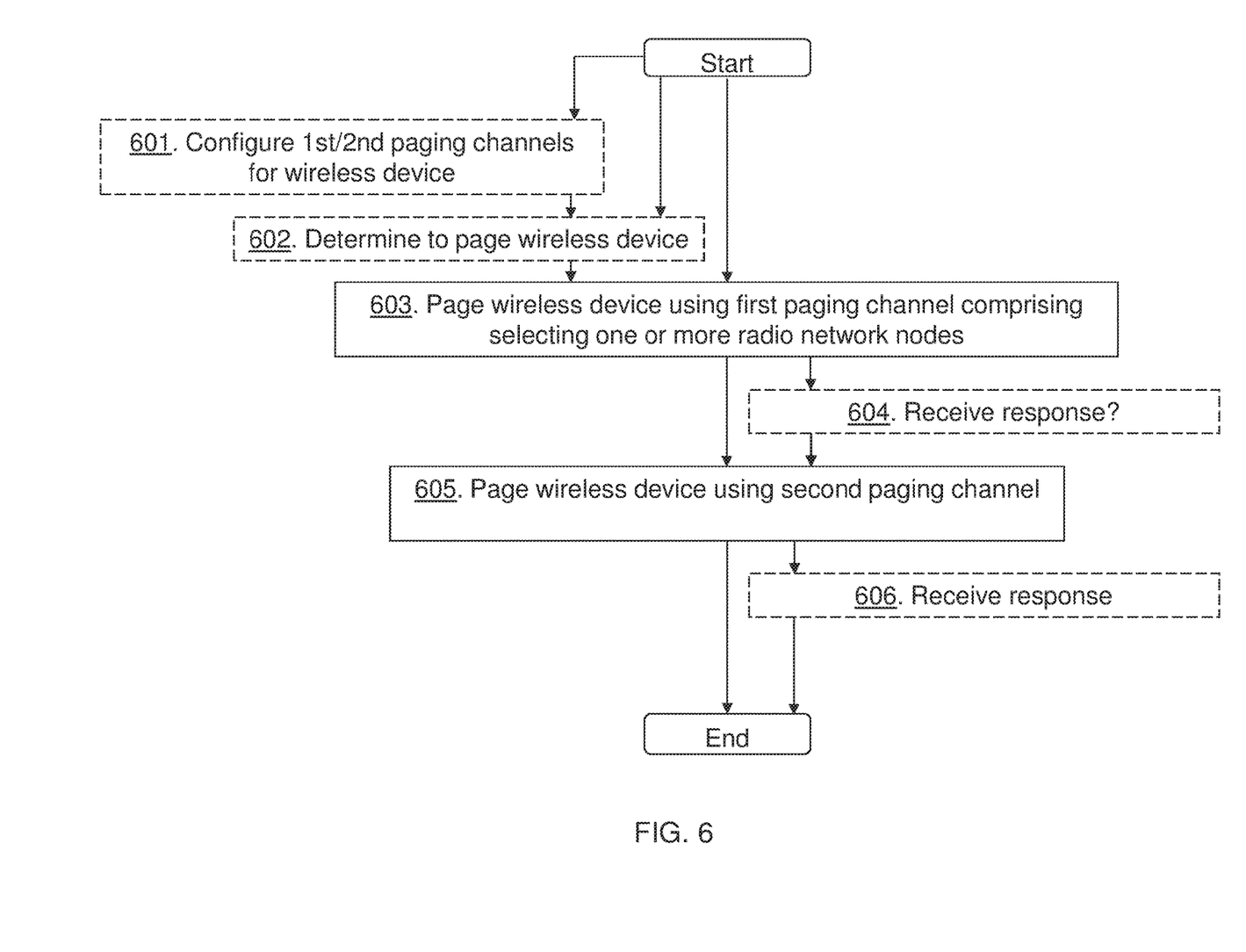
FIG. 6 is a flowchart depicting a method performed by a network node according to embodiments herein.

FIG. 6 is a flowchart depicting a method performed by the network node 13, such as an MME, for enabling communication of the wireless device in the wireless communication network 1. The actions do not have to be taken in the order stated below, but may be taken in any suitable order. Actions performed in some embodiments are marked with dashed boxes.

Action 601.

The network node 13 configures the first and second paging channel for paging the wireless device 10 in the wireless communication network. The first paging channel may be PCI based and the second paging channel may be explicitly configured by providing the identifier in the system information of the wireless communication network 1. The identifier may be provided in the MIB or the SIB of the system information.

Action 602.

The network node 13 may further determine to page the wireless device 10. For example, the network node 13 may receive a request from a service or another network node requesting positioning of the wireless device 10 or detect transmission of data toward the wireless device 10.

Action 603.

The network node 13 pages the wireless device 10 using the first paging channel. The paging comprises selecting one or more radio network nodes to page the wireless device 10 using the first paging channel based on information relating to current knowledge of the location of the wireless device 10. Thus, the network node 13 may page the wireless device 10 transmitting the paging message to a radio network node associated with the last current location of the wireless device known to the network node 13.

Action 604.

The network node 13 may then wait, e.g. over a time interval, on a response from the radio network node indicating that the wireless device 10 has responded to the paging message.

Action 605.

The network node 13 further pages or initiates paging of the wireless device 10 using the second paging channel. E.g. in case the network node 13 does not receive a response over the time interval or receives a page rejection message from a radio network node, such as the second radio network node 15, that may trigger the network node 13 to initiate the paging using the second paging channel.

Action 606.

The network node 13 may then receive a response indicating that the wireless device 10 has received the paging message. Thus, the paging is considered successful.

Figure 7:
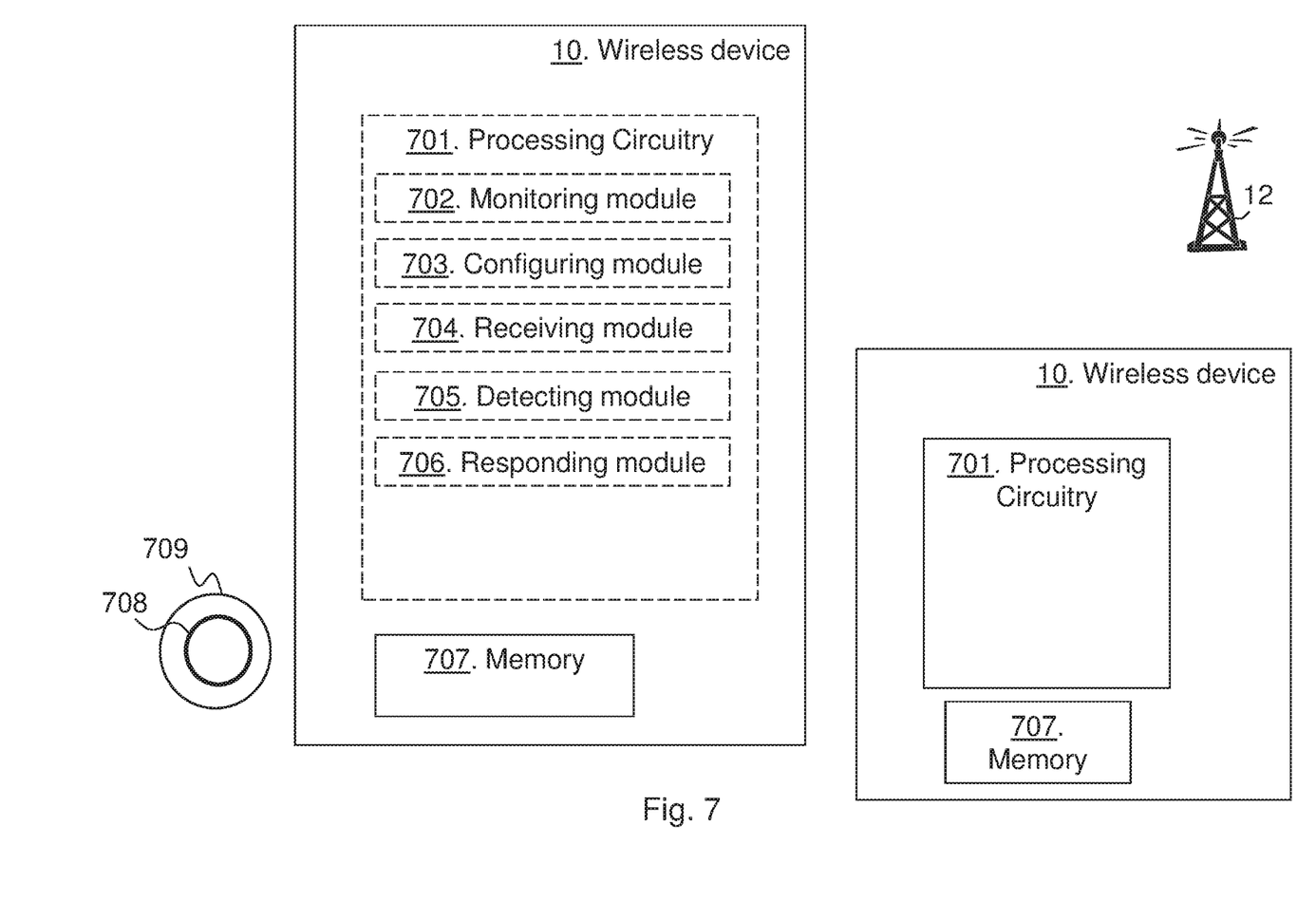
FIG. 7 is a schematic block diagram depicting a wireless device according to embodiments herein.

FIG. 7 is a schematic block diagram depicting the wireless device 10, according to two embodiments, for handling communication in the wireless communication network. Dashed blocks are optional modules/circuitries.

The wireless device 10 may comprise a processing circuitry 701, e.g. one or more processors, configured to perform the methods herein.

The wireless device 10 may comprise a monitoring module 702. The wireless device 10, the processing circuitry 701, and/or the monitoring module 702 is configured to monitor the first paging channel and the second paging channel. The first paging channel is PCI based and the second paging channel is explicitly configured by the identifier provided in the system information of the wireless communication network 1. The identifier may be provided in the MIB or the SIB of the system information. The wireless device 10, the processing circuitry 701, and/or the monitoring module 702 may be configured to monitor the first paging channel and the second paging channel consecutively in a paging window, e.g. first monitoring the first paging channel and directly followed by monitoring for the second paging channel in the paging window.

The wireless device 10 may comprise a configuring module 703. The wireless device 10, the processing circuitry 701, and/or the configuring module 703 may be configured, from the radio network node 12 or be pre-configured, to configure the wireless device 10 to monitor the second paging channel.

The wireless device 10 may comprise a receiving module 704, e.g. a receiver or a transceiver. The wireless device 10, the processing circuitry 701, and/or the receiving module 704 may be configured to receive one or more reference signals such as cell reference signals carrying information such as NR-PSS/SSS/TSS that provides timing and PCI that provides implicit mapping used to determine the DMRS of the service area 11.

The wireless device 10, the processing circuitry 701, and/or the configuring module 703 may be configured to monitor the first paging channel based on the information carried in the references signals.

The wireless device 10 may comprise a detecting module 705. The wireless device 10, the processing circuitry 701, and/or the detecting module 705 may be configured to detect the paging message in the first and/or the second paging channel.

The wireless device 10 may comprise a responding module 706. The wireless device 10, the processing circuitry 701, and/or the responding module 706 may be configured to respond to the paging message with the response such as a paging response to the radio network node transmitting the paging message.

The wireless device 10 further comprises a memory 707 comprising one or more memory units. The memory 707 comprises instructions executable by the processing circuitry 701 to perform the methods herein when being executed in the wireless device 10. The memory 707 is arranged to be used to store e.g. information, data such as configurations, reference signals, paging channel configurations, DMRSs, paging configurations etc.

The methods according to the embodiments described herein for the wireless device 10 may be respectively implemented by means of e.g. a computer program 708 or a computer program product, comprising instructions, i.e., software code portions, which, when executed on at least one processor, cause the at least one processor to carry out the actions described herein, as performed by the wireless device 10. The computer program 708 may be stored on a computer-readable storage medium 709, e.g. a disc, a USB, memory or similar. The computer-readable storage medium 709, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium. Thus, the wireless device 10 may comprise the processing circuitry and the memory, said memory comprising instructions executable by said processing circuitry whereby said wireless device is operative to perform the methods herein.

Figure 8:
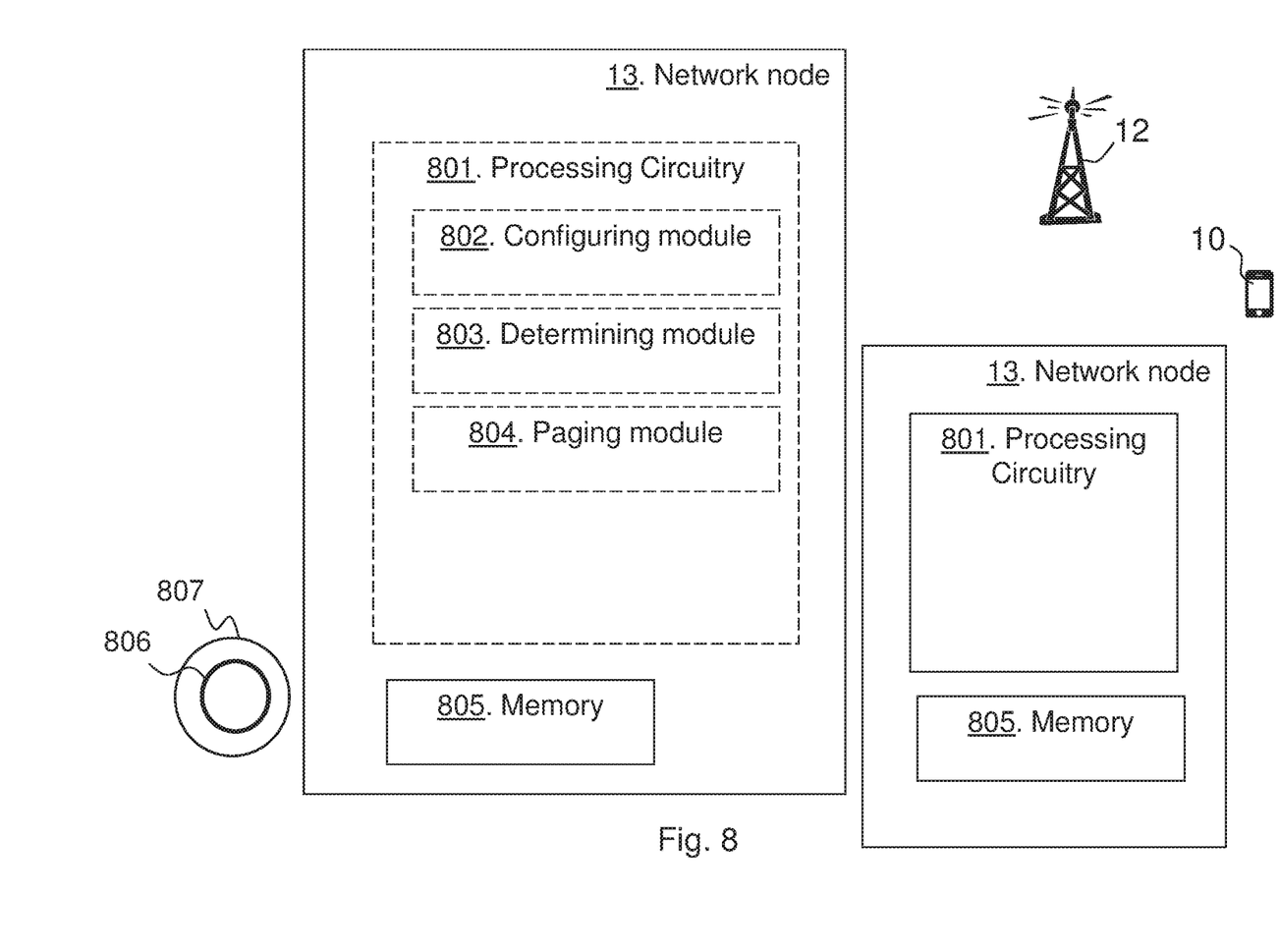
FIG. 8 is a schematic block diagram depicting a network node according to embodiments herein.

FIG. 8 is a schematic block diagram depicting the network node 13, according to two embodiments, for enabling communication of the wireless device 10 in the wireless communication network 1.

The network node 13 may comprise a processing circuitry 801, e.g. one or more processors, configured to perform the methods herein.

The network node 13 may comprise a configuring module 802. The network node 13, the processing circuitry 801, and/or the configuring module 802 may be configured to configure the first and second paging channel for paging the wireless device 10 in the wireless communication network. The network node 13, the processing circuitry 801, and/or the configuring module 802 may be configured to configure the first and second paging channel by providing the identifier of the wireless communication network 1 in the MIB or one of the SIBs of the system information.

The network node 13 may comprise a determining module 803. The network node 13, the processing circuitry 801, and/or the determining module 803 may be configured to determine to page the wireless device 10.

The network node 13 may comprise a paging module 804. The network node 13, the processing circuitry 801, and/or the paging module 804 is configured to page the wireless device 10 using the first paging channel. The network node 13, the processing circuitry 801, and/or the paging module 804 is configured to select one or more radio network nodes to page the wireless device 10 using the first paging channel based on information relating to current knowledge of the location of the wireless device 10. Thus, the network node 13, the processing circuitry 801, and/or the paging module 804 may be configured to page the wireless device 10 by transmitting the paging message to a radio network node associated with the last current location of the wireless device known to the network node 13.

The network node 13, the processing circuitry 801, and/or the paging module 804 may be configured to wait on a response from the radio network node indicating that the wireless device 10 has responded to the paging message.

The network node 13, the processing circuitry 801, and/or the paging module 804 is configured to page or initiate paging of the wireless device using the second paging channel, e.g. in case a response is not received or a page rejection message is received from the radio network node 15. The network node 13, the processing circuitry 801, and/or the paging module 804 may be configured to receive a response indicating that the wireless device has received the paging message. The first paging channel may be PCI based and the second paging channel may be explicitly configured in that the network node 13, the processing circuitry 801, and/or the configuring module 802 is configured to provide the identifier in the system information of the wireless communication network 1.

The network node 13 further comprises a memory 805 comprising one or more memory units. The memory 805 comprises instructions executable by the processing circuitry 801 to perform the methods herein when being executed in the network node 13.

The memory 805 is arranged to be used to store e.g. information, data such as configurations, reference signals, paging messages, etc.

The methods according to the embodiments described herein for the network node 13 may be respectively implemented by means of e.g. a computer program 806 or a computer program product, comprising instructions, i.e., software code portions, which, when executed on at least one processor, cause the at least one processor to carry out the actions described herein, as performed by the network node 13. The computer program 806 may be stored on a computer-readable storage medium 807, e.g. a disc, a USB, memory or similar. The computer-readable storage medium 807, having stored thereon the computer program, may comprise the instructions which, when executed on at least one processor, cause the at least one processor to carry out the actions described herein, as performed by the network node 13. In some embodiments, the computer-readable storage medium may be a non-transitory computer-readable storage medium.

Thus, the network node 13 may comprise the processing circuitry and the memory, said memory comprising instructions executable by said processing circuitry whereby said network node 13 is operative to perform the methods herein.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for handling communication of a wireless device in a wireless communication network, the method comprising:
    paging the wireless device using a first paging channel; and
    paging the wireless device using a second paging channel, responsive to determining that the wireless device has not responded to the paging of the wireless device using the first paging channel, wherein paging the wireless device using the first paging channel comprises selecting one or more radio network nodes to page the wireless device using the first paging channel based on information relating to current knowledge of a location of the wireless device;
wherein the first paging channel is Physical Cell Identity (PCI) based and wherein one or more properties of the second paging channel are derived from an identifier in system information transmitted by the wireless communication network.

2. The method of claim 1, comprising configuring the first and second paging channel in the wireless communication network for paging the wireless device in the wireless communication network.

3. The method of claim 2, wherein configuring the second paging channel comprises providing an identifier of the wireless communication network in a master information block or a system information block of the system information.

4. The method of claim 1, further comprising determining to page the wireless device.

5. The method of claim 1, wherein a demodulation reference signal (DMRS) for the second paging channel or a scrambling key for the second paging channel, or both, are derived from the identifier in the system information of the wireless communication network.

6. A method performed by a wireless device for handling communication in a wireless communication network, the method comprising:
    monitoring a first paging channel and a second paging channel for a paging message; and
    upon detection of the paging message, responding back to a radio network node sending the paging message, wherein the first paging channel is Physical Cell Identity (PCI) based and wherein one or more properties of the second paging channel is are derived from an identifier in system information transmitted by the wireless communication network.

7. The method of claim 6, wherein monitoring the first paging channel and the second paging channel comprises monitoring the first paging channel and the second paging channel consecutively in a paging window.

8. The method of claim 6, wherein the identifier is provided in a master information block or a system information block of the system information.

9. The method of claim 6, wherein the method further comprises deriving a demodulation reference signal (DMRS) for the second paging channel or a scrambling key for the second paging channel, or both, from the identifier in the system information of the wireless communication network.

10. The method of claim 6, wherein the method further comprises receiving the identifier in the system information in a Master Information Block (MIB) or a Secondary Information Block (SIB).

11. A non-transitory computer-readable medium comprising, stored thereupon, a computer program comprising instructions that, when executed on at least one processor, cause the at least one processor to carry out the method of claim 1, as performed by the wireless device or the network node.

12. A network node for handling communication of a wireless device in a wireless communication network, the network node comprising processing circuitry and memory operatively coupled to the processing circuitry, the memory comprising instructions for execution by the processing circuitry whereby the network node is configured to:
    page the wireless device using a first paging channel; and to
    page the wireless device using a second paging channel, responsive to determining that the wireless device has not responded to the paging of the wireless device using the first paging channel, wherein the network node is configured to select one or more radio network nodes to page the wireless device using the first paging channel based on information relating to current knowledge of a location of the wireless device;
wherein the first paging channel is Physical Cell Identity (PCI) based and wherein one or more properties of the second paging channel are derived from an identifier in system information transmitted by the wireless communication network.

13. The network node of claim 12, wherein the memory comprises further instructions for execution by the processing circuitry whereby the network node is further configured to:
    configure the first and second paging channel in the wireless communication network for paging the wireless device in the wireless communication network.

14. The network node of claim 13, wherein the memory comprises further instructions for execution by the processing circuitry whereby the network node is further configured to configure the second paging channel by providing an identifier of the wireless communication network in a master information block or a system information block of the system information.

15. The network node of claim 12, wherein the memory comprises further instructions for execution by the processing circuitry whereby the network node is further configured to
determine to page the wireless device.

16. The network node of claim 12, wherein a demodulation reference signal (DMRS) for the second paging channel or a scrambling key for the second paging channel, or both, are derived from the identifier in the system information of the wireless communication network.

17. A wireless device for handling communication in a wireless communication network, the wireless device comprising processing circuitry and memory operatively coupled to the processing circuitry, the memory comprising instructions for execution by the processing circuitry whereby the wireless device is configured to:
monitor a first paging channel and a second paging channel for a paging message; and,
upon detection of the paging message, respond back to a radio network node sending the paging message, wherein the first paging channel is Physical Cell Identity (PCI) based and wherein one or more properties of the second paging channel are derived from an identifier in system information transmitted by the wireless communication network.

18. The wireless device of claim 17, wherein the memory comprises further instructions for execution by the processing circuitry whereby the wireless device is further configured to monitor the first paging channel and the second paging channel by monitoring the first paging channel and the second paging channel consecutively in a paging window.

19. The wireless device of claim 17, wherein the identifier is provided in a master information block or a system information block of the system information.

20. The wireless device of claim 17, wherein the wireless device is further configured to derive a demodulation reference signal (DMRS) for the second paging channel or a scrambling key for the second paging channel, or both, from the identifier in the system information of the wireless communication network.

21. The wireless device of claim 17, wherein the wireless device is further configured to receive the identifier in the system information in a Master Information Block (MIB) or a Secondary Information Block (SIB).

* * * * *